LIQUID PERCUSSION MOTOR

Original Filed Oct. 24, 1966 5 Sheets-Sheet 1

INVENTORS:
RENIC P. VINCENT
LAWRENCE B. WILDER
BY Paul F. Hawley
ATTORNEY

LIQUID PERCUSSION MOTOR

Original Filed Oct. 24, 1966 5 Sheets-Sheet 2

INVENTORS:
RENIC P. VINCENT
LAWRENCE B. WILDER
BY Paul F. Hawley
ATTORNEY

LIQUID PERCUSSION MOTOR

Original Filed Oct. 24, 1966 5 Sheets-Sheet 3

INVENTORS:
RENIC P. VINCENT
LAWRENCE B. WILDER
BY Paul F. Hawley
ATTORNEY

LIQUID PERCUSSION MOTOR

Original Filed Oct. 24, 1966 5 Sheets-Sheet 4

INVENTORS:
RENIC P. VINCENT
LAWRENCE B. WILDER
BY Paul F. Hawley
ATTORNEY

LIQUID PERCUSSION MOTOR

Original Filed Oct. 24, 1966 5 Sheets-Sheet 5

INVENTORS:
RENIC P. VINCENT
BY LAWRENCE B. WILDER
Paul F Hawley
ATTORNEY

United States Patent Office

Re. 27,434
Reissued July 18, 1972

27,434

LIQUID PERCUSSION MOTOR

Renic P. Vincent and Lawrence B. Wilder, Tulsa, Okla., assignors to Pan American Petroleum Corporation, Tulsa, Okla.

Original No. 3,327,790, dated June 27, 1967, Ser. No. 596,374, Oct. 24, 1966. Application for reissue Sept. 13, 1968, Ser. No. 767,534

Int. Cl. B25d *17/06*

U.S. Cl. 173—73 30 Claims

Matter enclosed in heavy brackets [ ] appears in the original patent but forms no part of this reissue specification; matter printed in italics indicates the additions made by reissue.

ABSTRACT OF THE DISCLOSURE

A fluid actuated tool for applying repeated precussive blows to a drill bit in the drilling of oil and gas wells is disclosed. In particular, the invention concerns percussion motor for incorporation in drill strings, causing drill bits to vibrate or oscillate axially at the same time they are being rotated for the drilling of such wells. The disclosure includes a percussion motor containing two moving parts, a stepped piston-type hammer and a central cylindrical valve assembly. The stepped piston-type hammer is arranged in a mating step-type housing. An anvil is slideably mounted within the housing below the hammer and arranged for only limited axial movement, and arranged to be struck by the hammer. The central valve assembly cooperates with parts of the hammer and flowing fluid and thus oscillates between an upper seat in the lower part of the hammer and a lower seat in the top of the anvil. This valve oscillation in turn applies a resultant force alternatively to the top and bottom of the slideably mounted hammer, causing it to oscillate axially. In a preferred embodiment, means are provided to dampen the upper end of the valve moition. Various embodiments of the invention are described.

This application is a continuation-in-part of co-pending application 404,046, entitled, "Liquid Percussion Motor," filed Oct. 15, 1964, now abandoned, Renic P. Vincent and Lawrence B. Wilder, inventors.

This invention relates to fluid-actuated tools for applying repeated percussive blows to a drill bit in the drilling of oil and gas wells, and the like. In particular, the invention concerns percussion motors for incorporation in drill strings, permitting drill bits to vibrate or oscillate axially at the same time that they are being rotated for the drilling of such wells.

A number of designs of such percussion motors have been suggested in the past. Those which have had a measure of success in practice have been designed for use with a stream of high-pressure gas such as compressed air, or natural gas. The percussion motor is mounted at the lower end of the drill string and, in turn, is connected at the bottom to a suitable drilling bit. The stream of high-pressure gas, circulating through the drill string, percussion motor and bit, causes the bit to oscillate percussively against the formation and, thus, produces a major part of the drilling effect. The drill string is customarily rotated both to produce further drilling effect and to minimize deviations in the direction of the hole. The flow of air up the annulus between the walls of the hole and the drill string carry the formation cuttings and well fluids to the surface.

Such equipment does not work well when it is necessary to use a liquid (customarily a water or an oil base drilling fluid) to control flows of well fluids into the well and to carry formation cuttings to the surface. It is well known that the hydroulic head imposed by the annular column of liquid offers control under substantially all conditions against undesired flow of formation fluids into the bore.

However, since the specific gravity of liquid drilling fluids is many times that of gaseous drilling fluids and elastic properties are generally much lower, up to the present it has not been found possible to operate percussion motors satisfactorily in commercial drilling, using liquids as the actuating fluid. It must be kept in mind that rotary-percussive drilling is uneconomical unless the bit can be kept on bottom and drilling for long periods of time. The percussion motor must, therefore, be very rugged to permit commercial operations.

Even through drilling liquids returning to the surface usually pass through vibrating screens and are circulated through settling zones in the mud pits, it is substantially impossible to produce a stream of material to be recirculated through the drill string which contains no quantity of abrasive solids. Accordingly, it is very definite problem in the design of liquid-actuated percussive drilling motors to be able to maintain valve operation without excessive abrasion and resultant wear. Ordinarily, this is a problem with all moving parts in the motor.

It is also necessary to minimize effects of water hamper. Percusion motor valves must close rapidly to be effective. The frequently results in the formation of shock waves in the liquid, which may cause misoperation or destructive stressing of the motor parts.

It is an object of the present invention to provide a liquid-actuated percussion motor satisfactory for effective field operation in the drilling of oil, gas and water wells, and the like. A further object of the invention is to provide such a motor which may additionally be actuated by gas, if desired. A further object is to provide such a motor which can be operated at high frequency (of the order of 3,000 blows per minute, or more). Another object is to provide a percussion motor containing a minimum of moving parts, and in which possible breaking or abrasion of the motor parts is minimized. Another object is to provide such a motor in which water hammer is not a major problem. Still another object is to provide a percussion motor sufficiently independent of gravitational effects to be usable horizontally or oriented upwards. Further objectives and purposes of the invention will become apparent by perusal of this specification.

The invention is illustrated by the accompanying drawings which form a part of this specification. In these drawings.

In the drawings the same reference number refers to an identical or corresponding part.

In all of these designs the percussion motor basically contains two moving parts, a stepped piston-type hammer, and a central cylindrical valve assembly. There is a casing, or housing, to confine the actuating fluid, and an anvil slideably mounted within the casing below the hammer, but arranged for only limited axial motion. This anvil in turn is connected directly, or remotely, to the drilling bit. The anvil additionally is provided with splines and projections meeting with similar splines and projections in the inside lower part of the casing so that axial orque applied from the drill string to the casing will rotate the drilling bit while percussive drilling is proceeding.

In operation, the percussion motor is mounted at the ottom of a drill string, or string of pipe, which is rotatably mounted in a drill rig and supplied with a high-pressure fluid. Ordinarily this will be a liquid, though gas nay be used. This fluid does work in passing through the ibratory drilling device, or percussion drilling tool, experiencing a drop in pressure and being exhausted from n exhaust passageway in the drill bit affixed to the anvil f the percussion motor. The drilling fluid at lower pressure then returns to the surface, removing the drill cutings in its passage.

The central valve assembly oscillates between an upper nd lower position which in turn applies a resultant force lternately to the top and bottom of the slideably mounted ammer, causing it to oscillate axially. After each upward ycle of the hammer it is impelled forcibly downward o impact on the anvil, thus in turn causing the anvil to pply a series of percussive blows to the drill bit in conact with the earth formations. Preferably the drill string s rotated by the drill rig during this time so that between lows the drill bit is rotationally indexed to strike a lightly different part of the formation.

Figure 1:
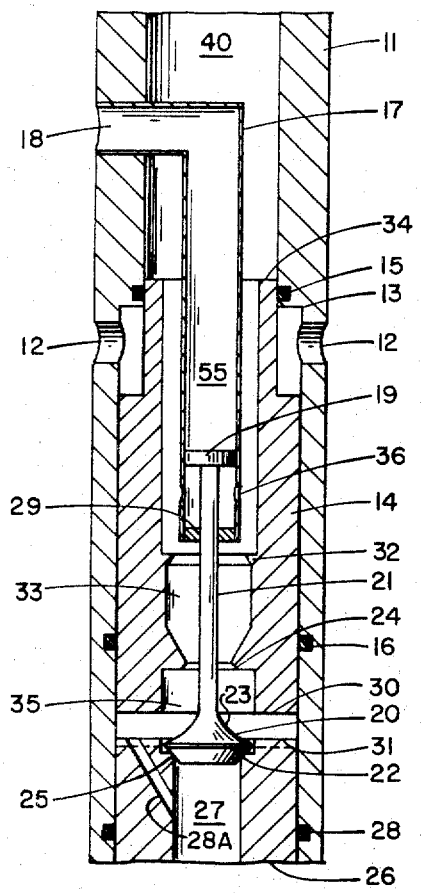
FIGURE 1 is a diagrammatic cross section of one form of the percussion motor.

In FIGURE 1 the tubular casing 11 is attached by neans (not shown) to the lower end of a conventional rill string, as already described. It is essential that this ubular casing 11 includes an upper portion of smaller nside diameter than that of the lower portion of this nember. Such relationship is shown in FIGURE 1. It is lso essential that there is a radial port 12, that is, a hole hrough the wall of this casing below the junction 13 of he upper and lower portion but near this junction.

The hollow stepped cylindrical hammer 14 is mounted or axial sliding within casing 11. The upper outer diamter of hammer 14 is machined to fit closely in the upper portion of casing 11. Similarly, the lower outer diameter f hammer 14 closely fits the adjacent lower portion of asing 11. Resilient seals 15 and 16 are preferably emloyed, either mounted on the casing 11 and in contact vith the hammer 14 or mounted on the outer diameter of he hammer 14 and in contact with casing 11. It is to be nderstood that the hammer is arranged for minimal eakage of fluid from the hollow bore 40 of casing 11 to orts 12. However, this does not demand that the entire uter diameter of either section of the stepped hammer 4 need be of uniform diameter. Only that portion which s employed to seal off liquid flow need be a maximum liameter; the rest may be relieved or of slightly less outer liameter, to minimize friction.

A center tube 17 is provided for use in controlling novement of the valve assembly. Center tube 17 is prefrably a thin walled pipe of uniform diameter concenrically mounted in casing 11 with the upper end 18 comnunicating directly with the outside of casing 11.

A valve assembly essentially consisting of a piston 19, n axially symmetric valve element 20, and a connecting od 21 for communicating force between piston 19 and alve element 20 is mounted substantially axially with the iston 19 closely fitting the inside of tube 17. There is a lownward force on the upper face of piston 19 due to the ressure of the fluid immediately outside casing 11 imosed through the opening 18 and tube 17 on this top surface of piston 19. There is a greater upward force on the ottom face of this piston 19. Basically this greater upward force is due to the fact the upward pressure on the ottom of piston 19 is the pressure of the operating liquid n the bore 40 of casing 11 which is at a considerably igher pressure than that outside casing 11, customarily nore than 100 p.s.i. greater.

Figure 2:
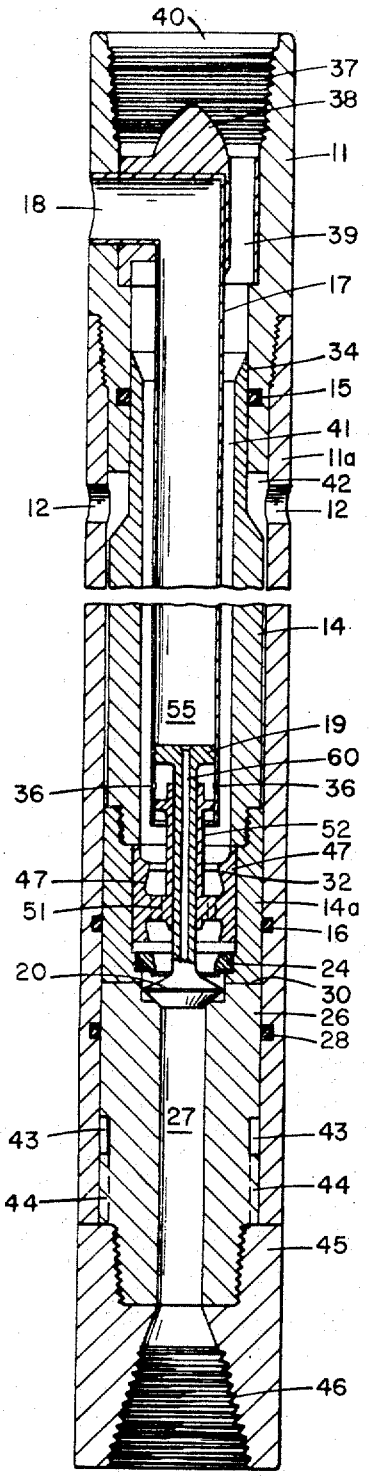
FIGURE 2 is a cross section of one complete form of such a device.

The cylindrical valve element 20 includes carefully nachined lower and upper surfaces 22 and 23 respectively. Near the bottom of the stepped hammer 14 the bore of he hammer is decreased and an annular member 24 is provided with an upper valve seat for the upper surface 23 of valve element 20. A lower seat 25 for the lower surface 22 of valve element 20 is provided in a recess in the top of the hollow cylindrical anvil 26. This anvil is slideably fixed within casing 11 below the hammer 14. Since it is desirable to have the exhaust liquid vented through the hollow bore 27 of anvil 26 only, preferably resilient seal 28 is mounted either on the inner diameter of the casing 11 and touching the upper part of the anvil 26, or on the upper outer diameter of anvil 26 and touching casing 11. If seals 28 are used, then it is desirable to include a passageway 28A from the top of the anvil, through the body of the anvil to passageway 27 below seat 22 to make the tool easier to start. The bottom part of the anvil 26 is arranged relative to the casing so that torque can be transmitted from casing to anvil as is shown in FIGURE 2.

A partition 29 is employed inside of the central tube 17 and outside the connecting rod 21 of the valve assembly. This seals between the tube 17 and the rod 21 so that fluid pressure below this means is not transmitted to the inside of the central tube above the partition. This partition 29 may be mounted on the tube 17 and in sealing relationship to the rod 21, as shown in FIGURE 1 or mounted stationary with respect to the hammer 14 and in sliding sealing relationship to the tube 17, as is shown in later figures.

When this tool is mounted on the end of the drill string, with the drill bit resting on the formation to be drilled and connected to anvil 26, and a supply of pressure fluid, preferably liquid, present in bore 40, the valve assembly and the hammer 14 oscillate axially alternately to cause the bottom face 30 of the stepped hammer 14 to impact and transfer much of its momentum to the top face 31 of the anvil 26, thus repeatedly percussing the attached drill bit against the face of the formation.

The operation involves one additional element—an annular valving element which is FIGURE 1 is an annular projection 32 on the inner bore of the stepped hammer 14, carried by said hammer above annular member 24. This annular member 32 is shaped so that as hammer 14 moves upward the annular member will slideably fit around center tube 17 and reduce considerably fluid communication from bore 17 to bore 33. Thus, in the part of the cycle illustrated in FIGURE 1, with the cylindrical valve element 20 seated on seat 25 in anvil 26, the upward force on the lower face 30 of hammer 14 is greater than the downward force on the upper face 34 of the hammer (due to the stepped construction) so the hammer moves upward under the pressure of the liquid in bore 17. However, as soon as the annular member 32 is adjacent the lower end of center tube 17, it reduces the fluid flow into bore 33. This reduction in fluid flow is accompanied by a substantial decrease in pressure in bore 35 so that ultimately as hammer 14 moves upward, the hydraulic force exerted on the top 34 of hammer 14 exceeds the upward force exerted by the liquid on the bottom face 30 of this hammer. At about the same time, the downward force exerted on the valve element 20 (the difference of pressure in bore 35 and that in passageway 27 times the cross sectional area of the valve seat 25) decreases. The upward force on the bottom face of piston 19 will be essentially that in bore 40 due to port 36 in tube 17, and this force will tend to increase as the annular member 32 cuts off, or reduces, flows of fluid to bore 33. The increase in upward force on piston 19 lifts the valve assembly from the lower seat 25 and propels it rapidly in an upward direction. We prefer that near the upper end of its stroke the valve motion be damped. This can be accompanied in various ways which are shown in the several figures. Thus, in FIGURE 1 the valve seat 24 is recessed into the stepped hammer 14. Below this seat, the bore of the hammer is slightly larger than the maximum diameter of the valve element 20 so that when moving up relative to the hammer and near the seat 24, the valve element 20 will produce considerable eddying in the liquid and hence damp the striking of the upper surface 23 of valve element 20 on its upper seat in member 24.

Now the fluid-filled volume below the seat in member 24 is in communication with the exhaust passageway 27 in the anvil 26, and the pressure within this space rapidly decreases. The downward force due to the pressure of the liquid on the upper face 34 of stepped piston 14 rapidly propels it downward. There is still a net upward force on the valve assembly composed of parts 19, 20 and 21 and therefore cylindrical valve element 20 remains seated against the seat in member 24 during the downward movement of hammer 14. This requires that the net upward force against the piston 19 (the pressure at part 36 times the area of piston 19 less the area of stem 21 opposed by the pressure in chamber 55 times the area of piston 19), be greated than the net downward force on valve element 23 seated in member 24 (the pressure in chamber 33 times the area of the minimum diameter of the upper valve seat in member 24 less the area of the stem 21 opposed by the pressure in chamber 35 times the minimum seat area in element 24). A convenient way to obtain the proper net force is to make the inside diameter of tube 17 greater than the minimum diameter of the upper valve seat in member 24.

The hammer 14 comes down to and impacts on the top face 31 of the anvil 26. It is important that there be no restriction in motion of the hammer just as it is about to strike the anvil. Accordingly, it is desirable, though not essential, to provide at least approximately radial grooves in either the upper face 31 of anvil 26 or the lower face 20 of hammer 14, or both, so that remaining liquid between these faces can be ejected rapidly into the exhaust passageway 27. This permits maximum impulse during the transfer of momentum from stepped hammer 14 to anvil 26.

During the downward motion of stepped hammer 14 the annular valve member 32 has once more cleared the end of the central tube 17, thus increasing pressure in bore 33 and consequently the downward pressure on the valve asembly. However, this pressure is not suffiient to unseat the valve. At the instant of impact, however, there is a maximum downward acceleration due to the abrupt stopping of hammer 14. Since the valve assembly contains considerable inertia, there will be an additional downward force at impact (not before) which is the product of the inertia times the acceleration. This furnishes the major downward force at this instant on the valve assembly. It is sufficient to unseat the valve from its upper position against seat 24 and to propel it quite rapidly into the lower seating position shown in FIGURE 1, in which the lower face 22 is in contact with seat 25. Before valve 20 is unseated from seat 24, there is an area A, exposed to the pressure of fluid in bore 33; however, when the valve is unseated there is a larger area $A_2$ exposed to the pressure in bore 33. The enlarged exposed area aids in driving the valve 20 downward. The sealing area of seat 25 has a diameter which exceeds the diameter of piston 19. Since the pressure in passageway 27 is approximately the same as that in the upper section 55 of tube 17 (there is no flow between these passages at this time), and since the pressure in bore 35 is now substantially the same as that on the lower srface of piston 19, it follows that there is a net seating pressure on the valve assembly tending to hold it against seat 25 in anvil 26 until the annular valve element 32 again minimizes flow into bore 33. In the meantime the pressure in bore 35 assumes a value somewhat less than the working pressure of the fluid in bore 40 (due to drop through the intervening passages), but there is a net upward force on the hammer 14 causing it to start the next cycle.

Preferably valve seat 25 is recessed into the upper part of anvil 26 sufficiently so that the maximum diameter of the cylindrical valve element 20 can be accommodated below the top face 31 of anvil 26. The valve seat 25, and the recess above it, are aligned with valve element 20 and valve element 20 closely fits this recess. Accordingly, if at any part in the cycle when valve element 20 should be seated on seat 25 it leaves this seat, the pressure on the upper face 23 of this valve will greatly exceed that on the bottom surface (which will be substantially equal to the pressure in exhaust passageway 27) and the valve will immediately re-seat.

Figure 6:
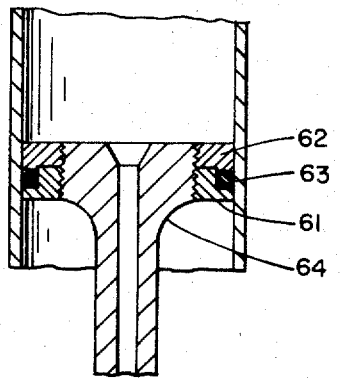
FIGURE 6 shows a detail of a part of the valve assembly shown in FIGURES 2 through 5.

One major difficulty which has been experienced with percussion drilling motors in the past is that their valves have been exposed to repeated high stresses and, therefore, break rapidly. This effect is minimized in the percussion drilling motor, or vibratory drilling device, forming this invention. It has seen that the forces are applied hydraulically and it is also seen that the design inherently provides for damping at the end of the valve upstroke. It is further seen, by an inspection of FIGURE 1 (and later in FIGURE 6), that the valve element and its connection to the piston 19 are arranged to minimize stress by having maximum radii of curvature from the connecting rod 21 to both the valve element 20 and the piston 19. No springs (devices inherently subject to breakage) are used. Also, there is no dependence on the force of gravity in the working of the device.

A drawing of a complete drilling device made in accordance with our invention is shown in FIGURE 2. Here the casing 11 is fitted at the upper end with a threaded section 37 suitable for connection to the drill string (not shown). In turn, the member 11 is threadably connected to member 11a, which is an extension of this casing of greater internal diameter than that of the upper section. The upper end of center tube 17, which is concentrically mounted within the casing. contains a mounting head 38 containing a passageway 39 which connects the bore 40 with the passageway 41 outside tube 17 and within the hammer 14. Preferably the cross sectional area of passage 39 is made as great as possible to minimize pressure drop. The stepped piston hammer 14 is mounted within the casing 11 as already discussed in connection with FIGURE 1. Ports 12 in casing 11 are sized to minimize pressure effects otherwise present in the variable volume between the stepped casing and the stepped hammer due to reciprocation of this hammer. Most of the major outer diameter of hammer 14 is slightly less than the inner diameter of lower portion 11a of casing 11, to permit axial motion of the hammer with minimal friction. Lower section 14a is screwed into the stepped hammer 14. Its outer diameter closely fits that of the lower section 11a of the casing and the resilient seal 16 insures that there is a minimum fluid leakage past the hammer. The top surface of the hammer 14 is shown beveled, which is advantageous to deflect the flow of the working fluid into passageway 41.

One preferred form of anvil 26 is shown in FIGURE 2. It is hollow and includes passageway 27 as before. At the lower end, anvil 26 is provided with means for transmitting torque from the casing 11 to the drill bit. Many variations of such torque transmission arrangements have been shown (for example, that described in U.S. Letters Patent 3,101,796). There is no particular functional difference in the many variations that can be employed; some are more easily made than others. In the arrangement shown in FIGURE 2, the lowermost part of the casing 11a has a decreased inside diameter consisting of a plurality of axial ridges 44, between each two of which are splines or grooves. These ridges 44 engage equivalent splines or grooves cut into the outer diameter of the lower portion of the anvil 26. In between these splines in anvil 26 are raised portions 43 which mate with the corresponding splines in the enlarged portion of casing 11a. A sub 45 is screwed on to the lower end of anvil 26. In drilling position it butts against casing 11a, since its outer diameter is substantially that of the portion of this casing 11. The splines in both the anvil 26 and the casing 11a are longer than the corresponding or mating ridges, so that until the drill bit touches bottom there is a vertical distance that nvil 26 can move between the position shown in FIGURE 2 and a lower position in which adjacent splines nd ridges are in top contact. This arrangement is referred o in the claims by stating that the anvil is slideably ixed within the casing. That is, it has a limited amount f axial motion between stops.

The sub 45 is provided at the lower end with a threaded ection 46 so that a drill bit can be threadably connected lirectly to the anvil. The fluid passageway 27 through the hollow anvil extends through the sub. Since drill bits are nanufactured with an axial passageway, there is complete luid communication from bore 40 through the anvil and lrill bit. The amount of axial travel permitted by the plined arrangement between anvil 26 and the casing 11a s made sufficient so that when the drill bit is not in conact with the formation, the piston 19 is below the ports 6. This position results because the pressure acting on he valve keeps the valve 20 in the bottom of the hammer losed and the hammer will continue to move downward ntil the piston 19 clears ports 36. At this time the direcion of the force on the valve changes to open the cloure in the bottom of the hammer. The hammer then will ssume some intermediate position in which fluid is circuated from inside the pipe to the well annulus through both he anvil passageway 27 and through the tube 17 and out utlet 18. This permits free circulation of fluid at any time he anvil 26 is fully extended.

It also provides a means for starting the hammer to scillate. It has already been shown that inertial forces n the valve member resulting from stopping the downvard motion of the hammer are necessary to dislodge the valve from the hammer seat. It follows that when the ool cannot be started when the anvil is not extended, the ammer is in contact with the anvil and the hammer valve s closed.

Actual starting occurs as follows: As the anvil 26 moves pward due to the bit contacting the formation and as he drill pipe is lowered, the hammer 14 which is floating ome distance above the anvil moves upward until the iston 19 crosses the ports 36. This shuts off the flow hrough tube 17, producing an upward force on the valve ssembly which closes the valve against the seat in memer 24. This causes the hammer 14 to move downward ntil the hammer 14 strikes the anvil 26. Since the anvil as not as yet traveled upward to its normal operating osition, the hammer makes a longer than normal stroke nd strikes the anvil. The valve moves from its seat in the ammer to that in the anvil. With the anvil valve closed, he hammer moves upward and is reversed in a normal nanner. Thus it can be seen that as the anvil moves upvard to its normal operating position the hammer stroke lecreases and the frequency increases until normal condiions are obtained.

The arrangement of the annular valve member 32 is lightly different in FIGURES 2 to 5 from the arrangenent shown in FIGURE 1. In these figures, this element orms part of a sleeve 47 which is concentrically mounted within the lower hammer member 14a by means of a pacer washer 48 and stop 49. Above element 32, the leeve 47 is hollowed to provide a passageway 50. The ninimum diameter of valve element 32 is slightly greater han the outside diameter of the center tube 17, so that when 32 approaches the lower end of center tube 17, as hown in FIGURE 4, the flow of fluid is considerably reduced and preferably is substantially shut off.

Sleeve 47 contains a plurality of webs 51 between which there are fluid passages (shown by the dotted lines n FIGURES 2 to 5) to permit fluid flow past the webs. The webs, in turn, support a valve rod guide 52 which surrounds rod 21 and maintains it substantially coaxial. The upper part of rod guide 52 is extended into a piston 53 which closely fits the inside diameter of center tube 17 and effectively minimizes fluid flow from the lower end of this tube. Accordingly, piston 53 forms a partition closely fitting the rod 21 and tube 17 and is attached to hammer part 14a. The liquid in cavity 54 (communicating through ports 36 with passageway 41) exerts only an upward force through the bottom of piston 19 on the valve assembly. The fluid pressure in bore 55 above piston 19 is equal to the pressure in the opening 18 of casing 11 and is, therefore, considerably lower, so that a net resultant upward force is present, tending to unseat the cylindrical valve element 20 from seat 25 in anvil 26.

However, as stated earlier, the sealing area of seat 25 has a diameter which exceeds the inside diameter of tube 17 or the outer diameter of piston 19 (substantially the same). When, as in FIGURE 3, the valve element 20 is seated on seat 25, the pressure of the liquid in bore 35 maintains the valve assembly seated as earlier mentioned, the recess 56 which, like seat 25, is aligned with a valve assembly, is made just slightly larger than the maximum diameter of the valve element 20. Thus, if the valve element 20 is temporarily unseated from seat 25 while the fluid working pressure still exists in bore 35, the unseating force due to the pressure on the bottom side of valve 20 is much less that the seating pressure on the top side and the valve immediately returns to its seated position until a substantial upward force is imparted to the valve assembly.

Figures 4, 5:
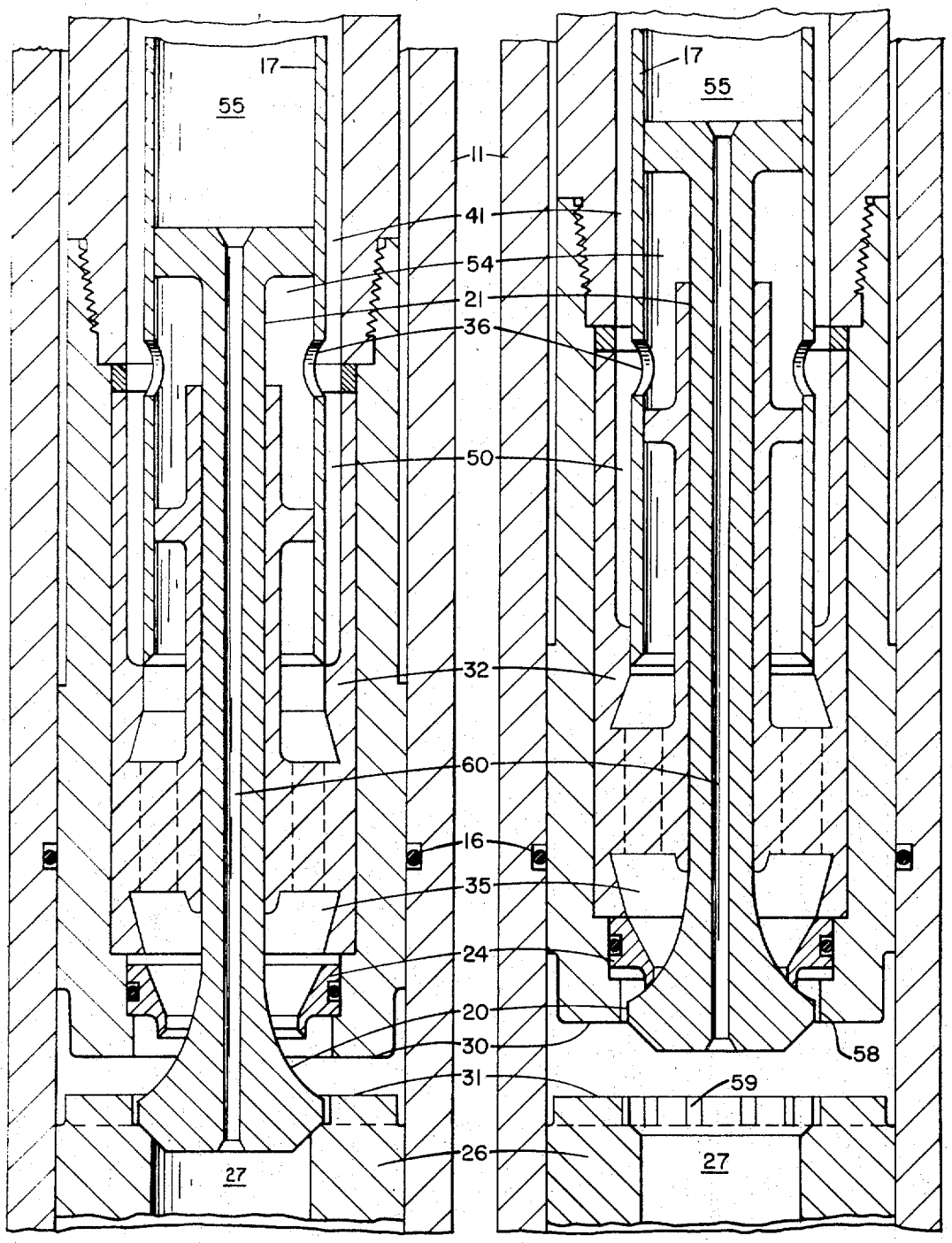

With the valve assembly in its lowermost position, the fluid pressure exerted through passageway 41 on bore 35 is exerted against the bottom face 30 of the hammer 14 and the hammer 14 rises, as shown in FIGURE 4.

When annular valve member 32 approaches the bottom of center tube 17, fluid communication between passageway 41 and bore 35 is reduced and the pressure in bore 35 decreases rapidly as the volume of bore 35 increases due to upward hammer movement. This imparts a strong upward force to the valve assembly, which unseats it. Force on the valve element 20 now substantially balances out and the net upward force, due to the high pressure in cavity 54 and the low pressure in bore 55, rapidly moves the valve assembly to the upper position.

Figure 3:
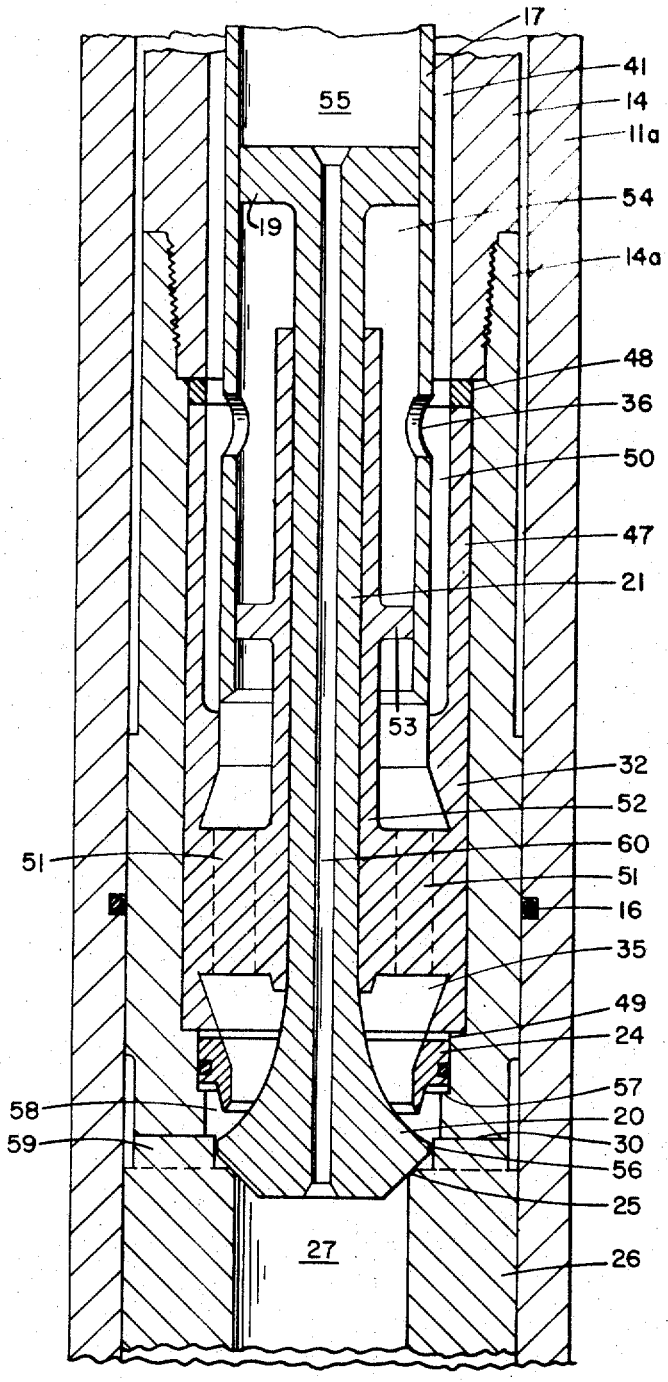
FIGURES 3 to 5 show an enlarged cross section of a portion of the motor illustrated in FIGURE 2, during different parts of an operating cycle.

As shown most clearly in FIGURES 3 to 5, the annular upper valve seating member 24 in this case is slideably fixed within hammer 14, that is, member 24 has limited axial motion between the stop consisting of the lower face of sleeve 47 and a second stop 57 in the inner wall of hammer 14 but above face 30. When the valve assembly is in the lowermost position closing passageway 27, the annular member 24 tends to ride against the lower stop 57. Thus, the space between the top of this member and the bottom of sleeve 47 is filled with liquid. When, as shown in FIGURE 5, the valve assembly is sharply drawn up against the seat of annular member 24 the liquid above this member is forced into bore 35.

It is desirable, though not essential, that annular member 24 be located sufficiently above the bottom face 30 of hammer 14 so that the valve element 20 may be recessed within the hammer, as shown in FIGURE 5, preferably with relative small clearance between the maximum diameter of the valve element and the minimum diameter of the recess 58 in the hammer. This increases the dashpot action; it also provides that when valve element 20 leaves the upper seat, any tendency of valve element 20 to reclose is minimized since the downward hydraulic force on the upper, larger face of valve element 20 is effective. This also adds to the inertial force effective in moving the valve element 20 from the upper seat to the anvil seat 25. It has been earlier specified that it is essential that the minimum area of the seal in annular member 24 be less than the area of piston 19 or tube 17.

In the arrangement shown in FIGURES 3 to 5, the length of stroke of the hammer is essentially governed by the maximum distance between the upper edge of annular valve member 32 and the lower edge of tube 17, since as soon as the fluid flow into bore 35 is minimized, the major force on the hammer is in a downward direction; the hammer is rapidly decelerated to a complete stop and accelerated in a downward direction. This downward motion continues until the hammer seats by impact against anvil 26, as shown in FIGURE 3. Any liquid present between the hammer and anvil exhausts through the center hollow part of exhaust passageway 27. To aid in the final drainage, at least substantially radial grooves 59 are cut in either the hammer or anvil.

Preferably, but not essentially, the central part of the valve assembly is made hollow by passageway 60. This simply insures that the relatively low pressures in bore 27 and bore 55 are substantially equal most of the time. The bore is sufficiently small so that the impedance to flow of liquid through this passageway is large and, accordingly, there is little leakage.

It is noted that in FIGURES 3 to 5 the outer diameter of the hammer is relieved at the bottom, and in the upper part above the area where the resilient seal 16 may contact the hammer 14. Diameter increase due to peening can be alleviated by relieving the outer diameter of the hammer 14 just above the lower face 30 and the outer diameter of the anvil below its upper face 31 without affecting the clearances between case 11a and 14a and the mating surfaces on the hammer and anvil.

It should be noted, as mentioned above, that the valve assembly possesses considerable inertia. The inertia force resulting when hammer 14 strikes anvil 26 furnishes the major downward force unseating the valve assembly from its uppermost seating position, shown in FIGURE 5, to its lowermost seating position, shown in FIG. 3. This is very desirable since it substantially prevents the opening of the valve during the downward stroke and thus minimizes a chance of impeded downward motion of the hammer 14 against the anvil 26. This is a special feature of this design of very definite importance.

It is aparent that the valve assembly arrangement, shown in the enlarged views of FIGURES 3 through 5, is essentially diagrammatic. Two points of explanation need be made. The sleeve 47 preferably is made of two matching split halves separated by a co-axial central plane, so that the guide may be placed around rod 21 during assembly. We have also found it desirable to make the piston 19 as shown in cross section FIGURE 6. The upper part of the rod 21 is threaded. Screwed to it are lower ring 61 and upper ring 62 which are jammed together. Between these is a groove containing resilient seal 63 which tends to seal between the piston 19 and the center tube 17. The radii of curvature at 64 where the connecting rod and piston meet, and the corresponding radius of curvature where the rod widens into the valve element 20, are as large as possible, to minimize the stress at these filleting points.

As an example of the effectiveness of this design, test models of a tool built substantially in accordance with the design of FIGURE 2, but with abrupt curves and no damping provisions, showed valve assembly failures after operating periods of a few score minutes at most. The design shown in FIGURES 3 to 5 was set up as a demonstration with a valve assembly made of aluminum alloy rather than steel (which, of course, would be used in practice) and successful operation for 9 hours was obtained. Operation without failure for over 41 hours was obtained using steel valves.

Figure 7:
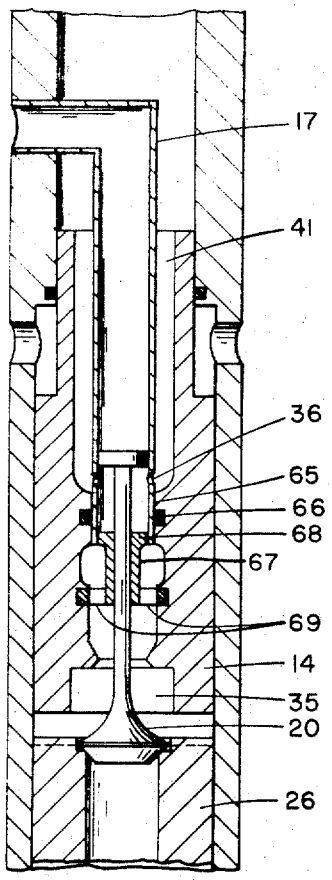
FIGURES 7 to 11 are diagrammatic cross sections of still further ombidiments of this invention.

FIGURE 7 shows diagrammatically a rotary percussion drilling tool of the type already discussed. However, in this case, the minimum diameter of hammer 14 opposite the center tube 17 has been locally decreased to make a substantially sliding fit at 65. An O-ring seal 66 has been added. In this case, therefore, fluid flow is through passageway 41 and ports 36 and out the bottom of tube 17. The annular valve member in this case is a member 67 mounted in the hammer 14 with a piston-like top member 68 with maximum diameter slightly less than the inner diameter of tube 17. This piston is so located that when hammer 14 reaches substantially the top of its stroke, piston 68 enters tube 17 and thus minimizes or shuts off flow of liquid from passageway 41 into bore 35. Axial passageways 69 are provided in annular member 67 to permit flow from passageway 41 to bore 35 except when piston 68 is at least adjacent tube 17.

Figure 8:
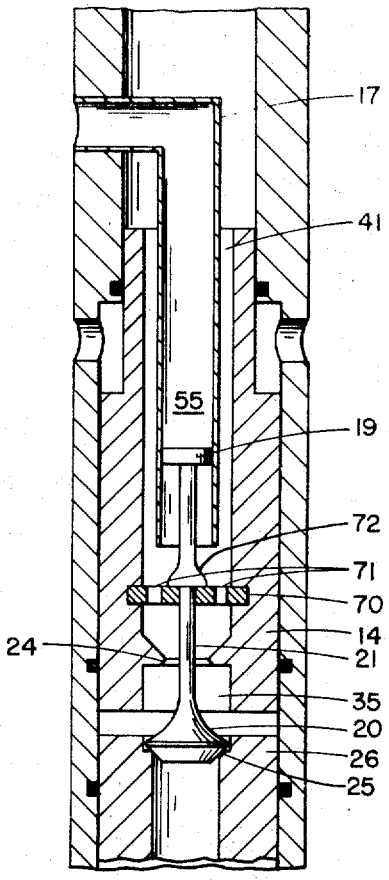

In FIGURE 8 a different system, still in accordance with our invention, is used to impart an upward axial force to the valve assembly to unseat valve element 20. In this case there is no lower radial port in the center tube 17 and piston 19 is always subjected to the difference in force due to pressures in bore 55 and in passageway 41. This, is previously discussed, is always an upward force. However, since the sealing area of lower seat 25 of the valve element 20 exceeds the cross sectional area of the interior of tube 17, an upward unseating force is necessary to initiate motion of the valve element from its lower to upper position. In this case this is achieved by mounting on hammer 14 an impact means consisting of plate 70 containing axial fluid passageways 71 for permitting flow from passageway 41 to bore 35. This plate 70 surrounds the lower portion of the connecting rod 21. This connecting rod is not longer of uniform diameter but contains a stop means 72. On each upward trip of hammer 14 the plate 70 strikes against the stop means 72 and imparts an upward axial force to this stop means, causing the valve element 20 to unseat from the lower seat 25 in anvil 26. The total upward force exerted by piston 19 then causes the valve assembly to continue upward travel until the valve element 20 is seated against the upper valve seat in annular member 24. One particular advantage of such an arrangement is that it tends to insure that the unseating of the valve assembly from its lower seat occurs at the same point in each cycle of motion of the hammer 14.

Figure 9:
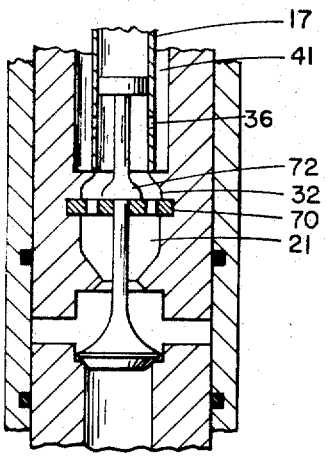

If desired, a modification of FIGURE 8, shown in FIGURE 9, may be employed. Here the upper annular valve member 32 is empjloyed as well as the plate 70 associated with the stop means 72 on the connecting rod 21. The plate 70 is positioned on the bore of the hammer 14 at such a point relative to the top of the annular valve member 32 that plate 70 dislodges the valve assembly just as the annular valve 32 minimizes flow through the passageway 41 outside tube 17.

It is to be realized in several of the drawings, for simplicity only, a number of reference characters have been omitted. Those involving any difference in construction or operation have been particularly identified.

Figure 10:
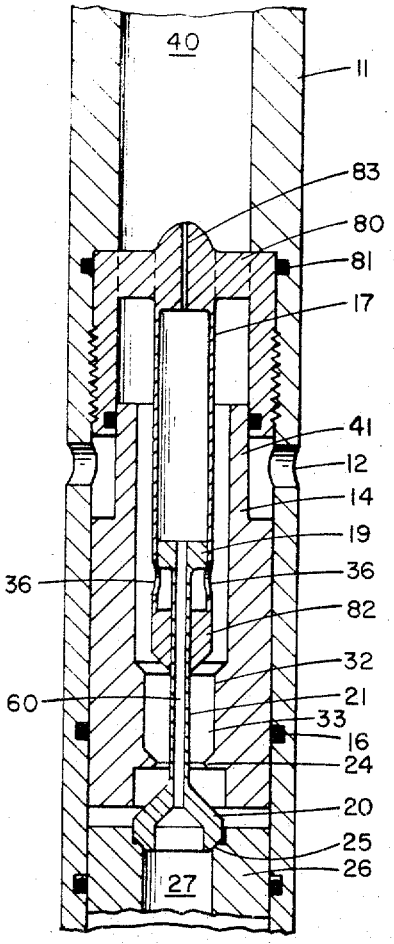
Figure 11:
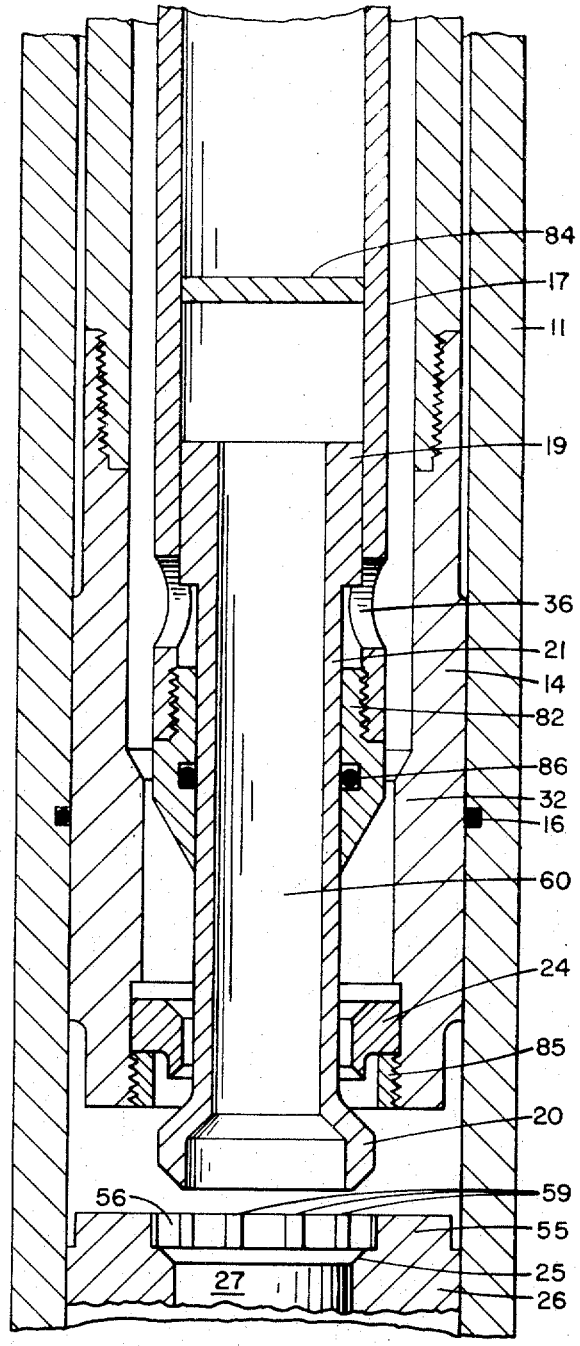

It is possible to modify the apparatus thus far discussed to provide still better for circulating a well as desired without affecting the drilling system. Two versions of this are shown in FIGURES 10 and 11. The main modifications that have been made here consist of inserting a stop 82 on the center tube at the lower end and below the side ports 36 to prevent the piston 19 from passing through the bottom of the center tube 17. In FIGURE 10, center tube 17 is supported within the casing 11 by a support 80 which is attached, for example, by screw threads, to the casing 11. It is desirable to introduce packing such as an O-ring 81 to minimize possibility of leaks of the drilling fluid used.

Near the bottom of the center tube 17 a stop means 82 is employed, which closely surrounds the connecting rod 21 of the valve assembly and accordingly guides it in its operation. The connecting rod 21 is hollow, thus providing fluid communication from the major part of the center tube 17 to the hollow bore 27 of anvil 26. The side ports 36 in the center tube 17 are located above the stop means 82 and are longer axially than the axial thickness of piston 19, so that when piston 19 is permitted to contact the stop means 82 the upper part of the side ports is above the piston 19.

Since the major part of the center tube 17 is in good fluid communication with the hollow bore 27 of anvil 26, i.e., the fluid exhaust from the drilling tool, the pressure in this major part of the center tube is considerably lower than that in the fluid intake 40 to the tool.

The length of the piston rod is so chosen that under ordinary drilling conditions the piston 19 is at all times above the side ports 36 so that there is no fluid communication through passageway 41 into the hollow bore of the connecting rod 21.

With this arrangement, the normal drilling operation of the tool shown in FIGURE 11 is as already discussed. The tool in FIGURE 10 is shown at a portion of the cycle in which fluid pressure from passageway 41 on the lower face of the hammer 14 is forcing the hammer upwardly, while maintaining the valve element 20 in its lowermost position against the lower valve seat 25 in anvil 26. When the annular valve member 32 approaches the lower outer edge of the center tube 17, fluid pressure in the bore 35 decreases markedly while the upward pressure on the lower surface of piston 19 is, if anything, slightly increased, thus raising the valve assembly and forcing it against the upper seat in annular member 24, which completes the cutting off of fluid pressure from the bottom face of the hammer 14. The hammer is now urged downward by the fluid pressure on its top surface, while the high pressure on the lower face of piston 19 and the relatively low pressure on its upper face, still in fluid communication with hollow bore 27, maintains the valve assembly in its uppermost position.

The impact of the hammer 14 on anvil 26 imparts a large inertia force to the valve assembly. This, and additionally the force on the upper valve element 20, impel the valve assembly rapidly downward after the hammer impact to reseat it in the position shown in FIGURE 10.

However, during the time that the tool and bit are off bottom, anvil 26 is in a much lower position. When the percussion drilling tool is off bottom it is important to be able to circulate drilling fluid through the tool and drill bit without the hammer operating. This is conveniently accomplished by providing the proper cooperation between the valve assembly and the anvil. When the tool is off bottom anvil 26 will, due to its weight, drop to the lower limits of its slidable position within housing 11. Valve 20 is then seated in the seat within the anvil. The valve assembly is held seated by pressure in chamber 35 being larger than the pressure in passageway 27. Hydraulic forces on the hammer cause it to be driven upwardly until annular member 32 substantially engages the bottom end of center tube 17. Connecting rod 21 is constructed of a length such that the top of piston 19 is now below ports 36. Tube 21 is made hollow as shown in FIGURE 11, for example. When piston 19 is below port 26, there is relatively free flow from space 40 of the intake of the tool through the annular space between the hammer and center tube 17, through ports 36 and hollow interior of tube 21 to bore 27 of anvil 26. To start the tool all that is necessary to do is to continue to circulate and lower the tool so that the bit rests on the bottom of the hole. Continued lowering of the tool forces the anvil 26 and the valve 20 upwardly within the device so that it will operate as described previously.

It is not to be understood that the center tube 17 must be completely removed from fluid communication with the fluid intake 40 to the tool. In fact, in FIGURE 11, a small bore intake 83 is shown. This serves as a hydraulic resistance, permitting flow of extra fluid through the tool beyond that required for the percussive drilling operation but which may be desirable for lifting of cuttings. The bore 83 must be maintained in only limited commuication, so that the fluid pressure in the major part of the center tube, i.e., the part above piston 19 will be at a considerably lower pressure than that in the fluid intake 40, although it will be somewhat above the pressure in hollow bore 27.

If there is no need for flow of extra actuating fluid through the device beyond that used for percussive drilling, the fluid communication with the fluid intake 40 to the device may be completely sealed off, for example, by partition 84, as shown in FIGURE 12.

In FIGURES 10 and 11 we have also shown a particularly advantageous shape for the valve element 20. The portion of maximum diameter has been axially extended to the order of one-quarter to one-half inch in length, and the recess 56 has been correspondingly deepened. Also, the upper valve seat in annular member 24 has been moved upward axially to permit the valve element 20 to enter the hammer 14 so that impact of the hammer on the anvil occurs before valve element 20 enters the recess 56. Increasing the axial length of the portion of the valve element 20 of maximum diameter means that the clearance between the valve element and recess 56 can be increased considerably with negligible effect on the valve action. Increased clearance means that there is much less erosion of the outer valve surface by the drilling fluid.

In FIGURE 11 the annular member 24 is shown held in place by a threaded annular ring 85, though other stop arrangements could be employed. Preferably, an O-ring type seal or packing 86 is employed between the valve connecting rod 21 and the stop means 82.

It is apparent that certain features are essential to this design and others can be considerably varied. In all cases there is a center tube with a close fitting piston inside, the upper surface of the piston being exposed to a pressure considerably lower than that at the fluid intake to the tool while the lower surface is exposed to the higher operating pressure of the actuating liquid. There is a stepped piston with pressure always being exerted against its upper, smaller face and periodically exerting against its lower, larger face to cause it to reciprocate. There is a valve assembly which includes the piston and which is aligned with the center tube, all being within the hammer. The valve assembly includes a double-acting valve which seats alternately in the top of the anvil and the lower part of the hammer. There is a means for unseating the valve from its lowermost position only after the hammer has reached substantially the upper end of its stroke. There is a system for preventing the valve in its uppermost position from seating in the lower position until after the hammer has impacted against the anvil. Since numerous variations have been shown, and still others are apparent to those skilled in this art, the invention is best described by the appended claims.

What is claimed is:

1. A vibratory drilling device comprising:

a housing having a port in the wall thereof, a hollow cylindrical hammer reciprocally mounted within said housing, sealing means between said hammer and said housing and cooperating therewith to form a variable volume chamber therebetween adjacent and in fluid communication with said port, the reciprocating of said hammer varying the volume of said variable volume chamber, a central tube substantially concentrically mounted within and stationary with respect to said housing, the outer diameter of said tube being generally smaller than the inner diameter of said hammer, a valve assembly including a cylindrical valve element and a piston fitting the inside of said tube, said valve element and said piston being connected a fixed distance apart by a connecting member, a first annular member carried by said hammer above the bottom thereof so shaped and cooperating with said valve assembly as to cause a substantial upward force to said valve assembly each upward stroke of said hammer sufficient to unseat said valve assembly, a second annular member carried by said hammer below said first annular member but near the bottom of said hammer to form a seat for the upper side of said valve element, and a hollow cylindrical anvil slidably fixed within and fitting the lower portion of said casing with the top thereof below the bottom of said hammer, said anvil being so shaped relative to said housing as to transmit axial torque, the bottom of said anvil being shaped for coupling to a drill bit, the hollow part of said anvil being shaped adjacent the top to form a seat for the lower side of said valve element, the sealing area of said seat having a diameter which exceeds the diameter of said piston.

2. Apparatus in accordance with claim 1 in which one of the bottom of said hammer and the top of said anvil is provided with drainage grooves connecting the outer part thereof with the hollow central portion thereof.

3. Apparatus according to claim 1 in which the least inside diameter of said second annular member is less than the diameter of said piston.

4. Apparatus according to claim 1 in which the least diameter of said seat of said anvil exceeds the diameter of said piston.

5. Apparatus in accordance with claim 1 including:

(1) stop means on said valve assembly, and (2) impact means fixed to said hammer and axially aligned with said stop means in such position that said impact means imparts an upward axial force to said stop means (and hence to said valve assembly) each stroke of said hammer at least near the upper end of motion of said hammer, to unseat said valve assembly from its lowermost position.

6. Apparatus according to claim 4 including means surrounding said connecting member and below any side port in said center tube for preventing flow of fluid through the bottom of said tube when said hammer is near the upper end of its movement.

7. Apparatus according to claim 1 in which the upper part of said tube is in fluid communication with a zone of fluid pressure considerably lower than that present at the fluid intake to said device.

8. An apparatus in accordance with claim 1 in which the upper part of said tube is connected to the outside of said casing and in which one of the bottom of said hammer and the top of said anvil is provided with drainage grooves connecting the outer part thereof with the hollow central portion of the anvil.

9. Apparatus in accordance with claim 1 in which said second annular member is slidably fixed within said hammer, so that initial contact of the upper surface of said valve element with said second annular member is damped by motion of said second annular member with respect to said hammer.

10. Apparatus in accordance with claim 1 in which the inertial force of said valve assembly upon impact of said hammer on said anvil is a major force moving said valve assembly from its maximum upward to maximum downward position relative to said hammer.

11. A fluid actuated percussion drilling tool comprising:

(1) a tubular casing containing an upper portion of smaller inside diameter than that of the lower portion thereof, there being a port through the wall of said casing below but near the junction of said upper and said lower portion, (2) a center tube substantially concentrically mounted within and on said casing with at least part thereof extending down into the lower portion of said casing, the upper part of said tube being connected to the outside of said casing, said tube containing a side port near the lower end thereof, (3) a valve assembly including a cylindrical valve element and a piston fitting the inside of said tube, said valve element and said piston being connected a fixed distance apart by a connecting rod, (4) a hollow, stepped cylindrical hammer slidably mounted within said casing and around said tube with upper outer diameter fitting the upper portion of said casing and lower outer diameter fitting the lower portion of said casing, the inner diameter of said hammer generally exceeding the outer diamter of said tube, said hammer carrying above the bottom thereof an annular member shaped to slidably fit said tube and adapted to reduce fluid communication between said tube below said piston and the bottom of said hammer when said annular member fits said tube, said hammer additionally carrying below said annular member a second annular member above but near the bottom of said hammer, the least inside diameter of which is less than the diameter of said piston, and which is adapted to form a seat for the upper side of said valve element, (5) means surrounding said rod and below any side port in said tube for preventing flow of fluid through the bottom of said tube when said hammer is near the upper end of its movement, and (6) a hollow cylindrical anvil slidably constrained within and fitting the lower portion of said casing in splined relation thereto, with the top of said anvil below the bottom of said hammer, the bottom of said anvil being shaped for coupling to a drill bit, said anvil being shaped adjacent the top to form a seat for the lower side of said valve element, the maximum diameter of the sealing area of said seat exceeding the diameter of said piston.

12. Apparatus in accordance with claim 11 in which said means for preventing flow of fluid through the bottom of said tube comprises a partition closely fitting said rod and said tube and attached to one of said tube and said hammer and in which a passageway is provided within said anvil establishing fluid communication between the top and the bore thereof below said seat.

13. Apparatus in accordance with claim 12 in which said seat for said valve element in the top of said anvil is recessed below the top of said anvil and said anvil is shaped above said seat to accommodate the maximum diameter of said valve element, so that on each down stroke of said hammer said anvil is struck by said hammer before said valve element seats in said anvil.

14. A liquid actuated percussion drilling tool comprising:

(1) a hollow cylindrical casing having an upper portion of smaller internal diameter than that of the lower portion and at least one radial port in said lower portion adjacent said upper portion, (2) a hollow cylindrical anvil slidably constrained and closely fitting the lower portion of said casing in splined relation thereto, said anvil being shaped at the lower end for connection to a drill bit, and being shaped at the top of the hollow portion to define a recessed valve seat, (3) a right cylindrical tube concentrically mounted within and on said upper portion of said casing and connected to the outside of said casing, the maximum diameter of the sealing area of said seat exceeding the inside diameter of said tube, said tube containing a radial port adjacent the lower end thereof, (4) a valve assembly including a cylindrical valve element attached through a valve rod to a piston slidably close fitting within said tube above said radial port, the lower surface of said element aligned and mating with said valve seat and fitting within the recess above said seat, (5) a cylindrical hollow hammer having an upper portion slidably close fitting the upper portion of said casing and a lower portion slidably close fitting the lower portion of said casing, the major part of the hollow portion of said hammer being larger than the outside diameter of said tube, said hammer carrying an annular valving element closely fitting the lower end of said tube and adapted to restrict liquid passage through the annular passage between said tube and said hammer when said valving element approaches the lower part of said tube, said hammer also carrying below said valving element and slidably constraining an upper valve seat member aligned and mating with the upper surface of said valve element, (6) means mounted on one of said tube and said hammer for sealing between said tube and said rod at least during the upper part of the stroke of said hammer.

15. An apparatus according to claim 14 in which at least one of the adjacent surfaces of said hammer and said anvil is radially grooved to drain fluid from between said surfaces into the hollow portion of said anvil prior to impact of said hammer on said anvil.

16. A vibratory drilling device comprising:

a housing having a port in the wall thereof, a hollow cylindrical hammer reciprocally mounted within said housing, sealing means between said hammer and said housing and cooperating therewith to form a variable volume chamber therebetween adjacent and in fluid communication with said port, the reciprocating of said hammer varying the volume of said variable volume chamber, a central tube substantially concentrically mounted within and stationary with respect to said housing, the outer diameter of said tube being generally smaller than the inner diameter of said hammer, a low pressure portion of said tube above its lower end being in fluid communication with a zone of fluid pressure considerably lower than that present at the fluid intake to said device, said tube containing a port near the lower end thereof, a valve assembly including a piston slidably fitting the inside of said tube and a valve element exterior of the lower end of said tube, said valve element and said piston being connected a fixed distance apart by a hollow connecting rod, the upper side of said piston being in communication with said low pressure portion of said tube, a first annular member carried by said hammer above the bottom thereof and shaped to slidably fit said tube and adapted to reduce fluid communication between the annular space between said tube and said hammer and the bottom of said hammer when said annular member is moved to an upper position to fit about said tube, a second annular member carried by said hammer above but near the bottom of said hammer, the least inside diameter of said second annular member being less than the diameter of said piston, said second annular member being further adapted to form a seat for the upper side of said valve element, means surrounding said connecting rod and below said side port in said tube for preventing flow of fluid through the bottom of said tube, hollow cylindrical anvil slidably constrained within and fitting the lower portion of said casing, said anvil being so shaped relative to said housing as to transmit axial torque, the bottom of said anvil being shaped for coupling to a drill bit, the hollow part of said anvil being shaped adjacent the top to form a seat with a lower side of said valve element, the seating area of said seat in said anvil having a diameter which exceeds the diameter of said piston.

17. Apparatus according to claim 16 in which said seat for said valve element in the top of said anvil is recessed below the top of said anvil and said anvil is shaped above said seat to accommodate the maximum diameter of said valve element so that on each down stroke of said hammer said anvil is struck by said hammer before said valve element seats in said anvil, and said center tube is in limited fluid communication with said fluid intake to said device but the fluid pressure in the major part of said center tube is considerably lower than that in said fluid intake.

18. Apparatus as defined in claim 16 in which the structural relationship is such that when said anvil is in its lowermost position in said housing and in which said valve element of said valve assembly is seated in the seat of said anvil, the said piston is below the port in the wall of said center tube so that there is relatively free fluid communication and flow from the annulus between said hammer and said center tube through said port in said center tube, the hollow portion of said connecting rod and the hollow bore of said anvil.

*19. In a percussion drill having a casing with a forward part of greater transverse area than the rear part thereof, a hammer piston reciprocable in said casing and having differential forward and rearward working faces received respectively in said casing forward and rear parts, there being a longitudinal passage extending through said piston, a connection for supplying operating fluid to said casing rear part under normal operating conditions, and an anvil in said casing forward part with an exhaust duct therethrough, the improvement comprising first and second opposing value seats respectively at the adjacent ends of said longitudinal passage and said exhaust duct, a check valve received between said seats, and means operable on said valve for impelling the same towards said first seat, under normal operating conditions, during the latter part of the rearward return stroke of said piston for restricting said piston passage and exhausting said casing forward part through said anvil duct and thereby initiating the forward power stroke, said valve impelling means being calibrated and said valve being of sufficient mass to cause said valve to be impelled forwardly against said anvil seat, upon striking of the anvil by said piston, to clear said piston passage and close said exhaust duct and thereby initiate the return stroke of the piston.*

*20. In a fluid operated percussion drill, a casing, an anvil at the forward end of said casing having an exhaust duct, a piston reciprocable in said casing for beating upon said anvil, said piston having a longitudinal passage therethrough and having a forward working face which is larger than the rearward working face thereof, and a connection at the rear end of said casing for constantly supplying operating fluid to said piston rear face and forwardly through said piston passage under normal operating conditions, the improvement comprising opposing piston and anvil valve seats at the adjacent ends of said piston passage and said exhaust duct, a double acting check valve having seating parts movable between and cooperable with said seats, and means for impelling said valve toward said piston valve seat under normal operating conditions during the latter part of the rearward return stroke of said piston while opening said exhaust duct to said casing forward part for producing the forward power stroke of said piston, said valve seats being spaced apart axially of the drill a greater distance than said seating parts and said valve impelling means being calibrated and said valve being constructed and arranged to cause said piston to be impelled against said anvil seat, when said piston strikes said anvil, to close said exhaust duct and open said piston passage to said casing forward part and thereby produce the return stroke of said piston.*

*21. In a percussion drill having a casing, a connection for supplying operating fluid to the rearward part of said casing and an anvil at the forward part thereof, a hammer piston reciprocable in said casing to beat upon said anvil, the forwardly-facing area of said piston being exposed to the forward part of said casing and being greater than the rearwardly-facing area thereof, passage means leading from said connection to the forward part of said casing, an exhaust duct leading from said casing forward part, the improvement comprising valve seat elements, respectively, in the outlet of said passage means and the inlet of said duct, valve means movable between said seat elements, and means for alternately causing seating of said valve means on said exhaust duct and passage means seat elements to thereby cause successive application of the operating fluid pressure through said passage seat element to said piston forwardly-facing area, while said exhaust duct seating element is closed, for impelling said piston rearwardly, and for closing said passage seat element to exclude said fluid pressure from said forward*

*piston area while exhausting said forward casing part through said exhaust duct seat element to cause said piston to beat upon said anvil.*

*22. In a fluid operated percussion tool, a casing, an anvil at the forward part of said casing with an exhaust duct, a differential piston working in said casing with its forward working face larger in transverse area than its rearward working face, a connection at the rear end of said casing for supplying working fluid to the rearward part of said casing, and a longitudinal passage through said piston, the improvement comprising opposing piston and anvil valve seats, respectively, at the adjacent ends of said piston passage and anvil duct, a unitary double-acting check valve floating between said seats, and means to maintain said valve against said piston seat during normal operation in the latter part of the rearward return stroke and during the forward working stroke of said piston to cause said working stroke, said valve maintaining means being calibrated and said valve being constructed and arranged to cause said valve to be impelled forwardly by inertia upon striking of said anvil by said piston to close said anvil exhaust duct and again expose said larger piston forward surface to the working fluid to repeat the cycle.*

*23. A percussion drill as described in claim 22 in which said valve means comprises a one-piece valve body having upper and lower seating faces for cooperating alternately with said seating elements.*

*24. A percussion drill as described in claim 23 further including cooperating structures projecting, respectively, from said valve body and the wall of said piston passage for unseating said valve body from said exhaust duct seat element during the return stroke of said piston.*

*25. A percussion drill as described in claim 22 in which said piston valve seat constitutes a substantial restriction in said piston passage to reduce the area of said valve exposed to the operating fluid during the working stroke and thereby reduce the force necessary to maintain said valve on said piston seat during the working stroke.*

*26. A percussion drill as described in claim 25 in which said passage valve seat is separately formed and replaceable for repair purposes and to adjust the area of said valve means exposed to the operating fluid pressure when said valve means is seated on said passage seat element.*

*27. A percussion drill as described in claim 22 further including a stop member in the rear part of said casing positioned to limit rearward movement of said piston but to clear said piston during normal reciprocation thereof.*

*28. A drill as described in claim 22 further including a constantly open bypass opening through said valve body.*

*29. In a percussion drill having a casing with an upper part of greater transverse area than the lower part thereof, a hollow hammer reciprocable in said casing between a lower and an upper position and having differential upper and lower working faces received respectively in said casing upper and lower parts, a connection for supplying operating fluids to said casing upper part under normal operating conditions and an anvil in said casing lower part with an exhaust duct therethrough, the improvement comprising:*

*a center guide tube supported from the upper part of said casing and extending down into the hollow interior of said hammer, there being an annular space between said hammer and said center guide tube for the flow of fluid therethrough;*

*an anvil valve seat in the upper part of said anvil surrounding said duct;*

*a hammer valve seat carried in the lower portion of said hammer;*

*a valve means having a lower surface and an upper surface for seating alternatively respectively in said anvil seat and said hammer seat;*

*an annular member carried by said hammer and shaped to slideably fit the lower outer wall of said center tube when said hammer is in an upper position so as to reduce the flow of fluid through said annular space;*

*means to move said valve upwardly toward said hammer valve seat when said hammer is in its upper position.*

*30. A percussion drill as defined in claim 29 including a passage means from said connection through said center tube and said valve element to said exhaust duct.*

References Cited

The following references, cited by the Examiner, are of record in the patented file of this patent or the original patent.

UNITED STATES PATENTS

| | | | |
|---|---|---|---|
| 745,900 | 12/1903 | Payton | 91—225 |
| 2,758,817 | 8/1956 | Bassinger | 91—50 |
| 2,947,519 | 8/1960 | Fencht | 173—73 |
| 3,167,136 | 1/1965 | Cook | 173—80 |
| 3,180,434 | 4/1965 | Vincent | 173—73 |
| 3,195,657 | 7/1965 | Collier | 173—66 |

NILE C. BYERS, JR., Primary Examiner

U.S. Cl. X.R.

91—319; 173—136; 175—296